A. O. MATHISON.
WORK HOLDING COMBINATION.
APPLICATION FILED DEC. 15, 1917.
1,281,624. Patented Oct. 15, 1918.
2 SHEETS—SHEET 1.
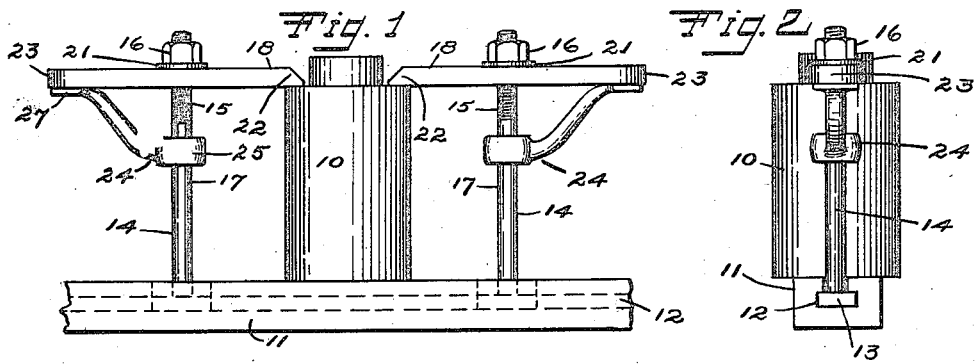
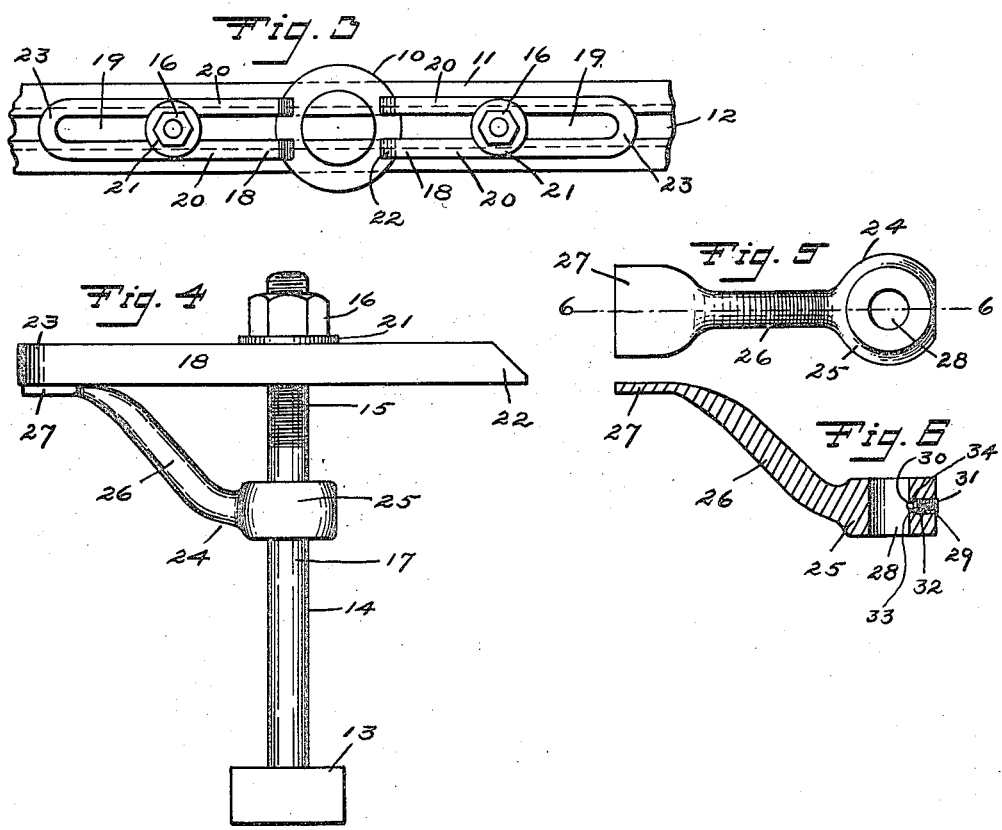
Inventor
Albert O. Mathison
By Louis M. Schmidt
Atty.

A. O. MATHISON.
WORK HOLDING COMBINATION.
APPLICATION FILED DEC. 15, 1917.
1,281,624.
Patented Oct. 15, 1918.
2 SHEETS—SHEET 2.
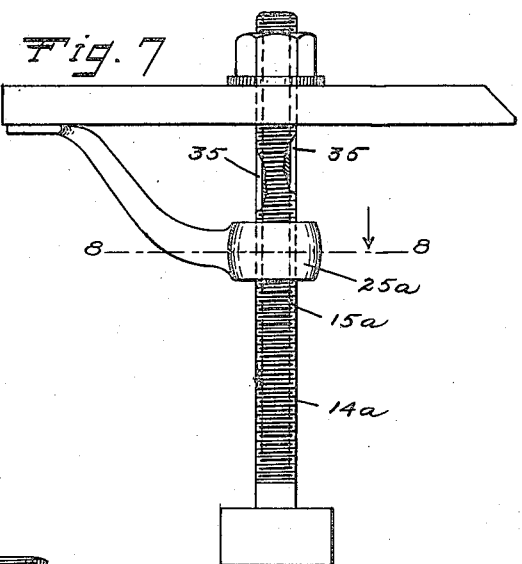
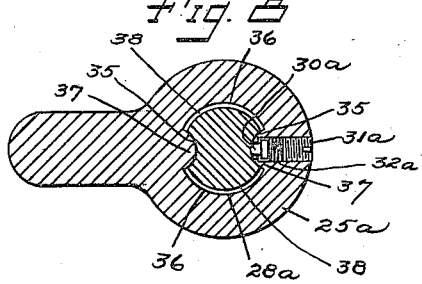
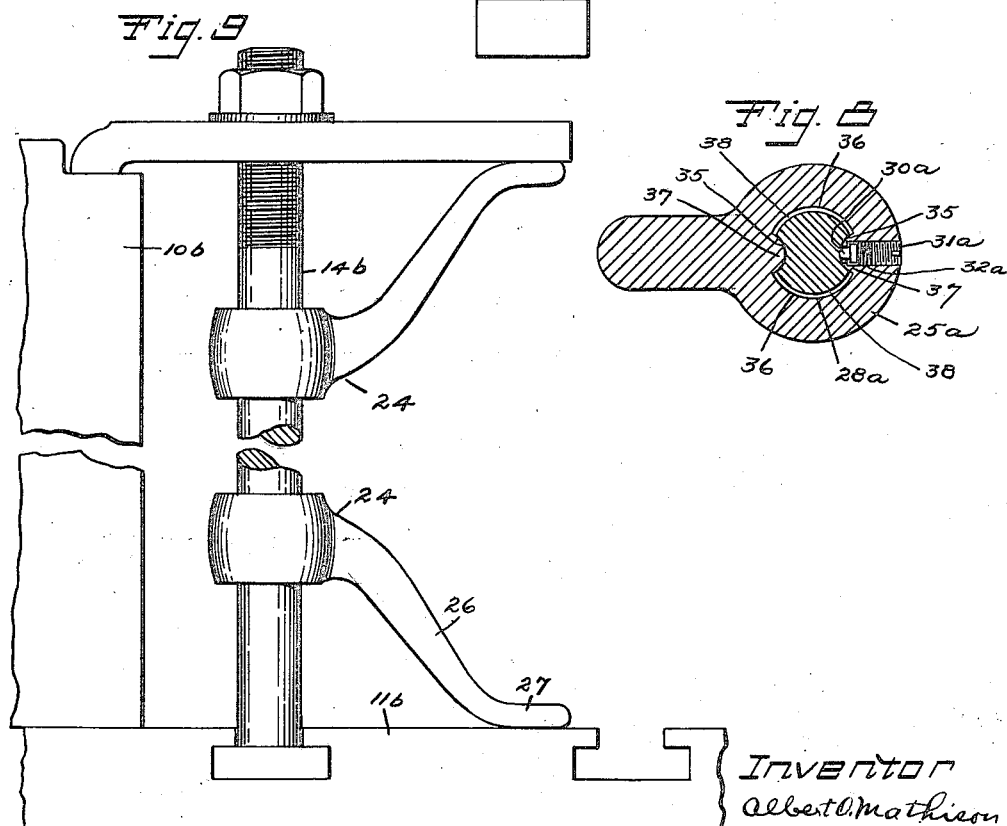
Inventor
Albert O. Mathison
By Louie M. Schmidt
Atty.

UNITED STATES PATENT OFFICE.

ALBERT OLAI MATHISON, OF NEW BRITAIN, CONNECTICUT.

WORK-HOLDING COMBINATION.

1,281,624. Specification of Letters Patent. Patented Oct. 15, 1918.

Application filed December 15, 1917. Serial No. 207,342.

*To all whom it may concern:*

Be it known that I, ALBERT O. MATHISON, a citizen of the United States, residing at New Britain, in the county of Hartford and State of Connecticut, have invented certain new and useful Improvements in Work-Holding Combinations, of which the following is a specification.

My invention relates to improvements in work holding combinations of the type adapted for holding work on the bed of a planer or other machine tool or on the face plate of a lathe, particularly of large size, and the object of my improvement is to produce a device that is readily set to the position desired to fit a particular piece of work and which after being so set and after the clamping pressure has been applied will firmly hold the work while the same is being operated upon by the cutting tool or other tool that may be used.

In the accompanying drawing:—

Figure 1 is a side elevation of a pair of my improved work holding combinations and a piece of work held thereby on the bed of a machine tool, the bed being in part broken away.

Fig. 2 is an end elevation of the same.

Fig. 3 is a plan view of the same.

Fig. 4 is a side elevation, on an enlarged scale, of one of the work holding combinations shown in Fig. 1.

Fig. 5 is a plan view of the brace.

Fig. 6 is a sectional view on the line 6—6 of Fig. 5.

Fig. 7 is a side elevation of a modification of my improved work holding combination.

Fig. 8 is a sectional view on the line 8—8 of Fig. 7.

Fig. 9 is a side elevation of a work holding combination in use for holding a relatively high piece of work to a machine bed and utilizing therefor a correspondingly long bolt and a pair of packing members, one of the latter being positioned at the upper end portion of the bolt and serving as an upper brace proper, in coöperation with the work engaging strap, and the other, positioned at the lower end portion of the bolt, and engaged by means of the lateral arm with the bed, serving as a lower brace.

My improved work holding combination is adapted for use in holding a piece of work, such as the block designated by the character 10, to the bed 11 of a planer or other machine tool, or to the faceplate of a lathe, particularly such as is used with lathes of large size, and which are provided with suitable sets of grooves 12, of inverted T-shape, for receiving and holding the head 13 of a clamping member 14, usually in the form of a bolt, substantially as shown.

In the form shown in Figs. 1 to 6 inclusive the clamping bolt 14 is substantially of the usual form, comprising the head 13 at the lower end and which is positioned in the groove 12, having the threaded portion 15 at the other or upper end, for receiving the nut 16, and intermediate the said ends having the body portion 17 of cylindrical form, the length and diameter of the bolt being adapted approximately to the depth of the work 10 that is to be clamped to the bed 11 and the threaded portion 15 being of suitable length to permit of a relatively fine adjustment of the parts for the final clamping position.

The work 10 rests on the bed 11 and the top face thereof is engaged by one end of a clamp 18, which may be of the usual U-shape, with the threaded portion 15 of the bolt 14 positioned in the slot 19 or open space between the side arms 20, a washer 21 being interposed between the said side arms 20 and the clamping nut 16. Thus the inner end 22 of the clamp 18 engages with the work 10, the middle portion thereof engages with the nut 16, and means are provided for supporting the outer end 23.

The usual manner of supporting the outer end 23 of the clamp 18 is to provide a packing block or build up packing material for being interposed between the same and the bed. In lieu of such packing means, I provide a brace 24 in the general form of a bracket, comprising a body portion 25 slidably mounted on the bolt 14 and an arm 26 extending laterally from the said body portion 25 and also directed upwardly, suitably to engage by its outer end 27 with the under side of the said outer end 23, in the usual position of the packing block where such block is used. It will be noted, however, that by reason of the overhanging feature of the arm 26 the packing is effected without using the bed or making contact therewith, so that my improved packing means can be used in positions where the ordinary packing means cannot be used.

The body portion 25 is in the form of a sleeve, having a bore 28 that is a good sliding fit for the body portion 17 of the bolt 14.

In use, the strap 18 is brought to approximately a horizontal position, with the inner end 22 bearing on the work and then the brace 24 is slid along the bolt 14 until the clamping arm 26 bears against the outer end 23 of the clamp 14, then screwing down on the nut 16 effects the clamping of the work 10 on the bed 11. The body portion or sleeve 25 is firmly held in the clamping position on the bolt 14 by the cramping or binding due to the distortion or tilting effects, or combinations thereof that are produced by the clamping pressure of the nut 16.

As a convenience in setting the brace 24 so that the same will remain in any elevated position to which the same may be lifted for a given setting, preliminary to screwing down on the nut 16, a friction device may be incorporated in the sleeve 25 of any suitable form. As shown, the side wall of the sleeve 25 is provided with an opening 29 in which are housed a small bearing block or plug 30 at the inner portion, for bearing against the bolt 14, a screw plug 31 at the outer portion, and a coil spring 32 intermediate these parts. The bearing plug or block 30 may have at the outer end an enlarged head 33 for engaging with an annular shoulder 34 in the opening 29 for limiting the inward movement thereof, so that the said plug or block will not fall out through the bore 28 when the brace 24 is removed from the bolt 14.

In the modification shown in Figs. 7 and 8 the bolt 14$^a$ has a screw thread 15$^a$ extending along substantially the entire length, and special provision is made to prevent injury to the said thread 15$^a$ as follows:—The bolt 14$^a$ has a pair of grooves 35 extending longitudinally on opposite sides, which may be of rounded form, as shown. The sleeve 25$^a$ has a bore or opening 28$^a$ of the same general form as the cross-section of the bolt 14$^a$, modified by the grooves 35 mentioned, comprising portions 36 extending in curved form for appreciably less than a semi-circle that are opposed to the threads 15$^a$ on the bolt 14$^a$ and connecting the said curved portions 36 are inwardly projecting lug portions 37 that are a good fit in the grooves 35. As a detail, the curved portions 36 are separated from the threads 15$^a$ by a clearance space 38.

Thus the sleeve 25$^a$ may be slid along the bolt 14$^a$ to any position desired without injury to the thread 15$^a$.

The frictional holding device, composed of the block or bearing plug 30$^a$, screw plug 31$^a$, and coil spring 32$^a$ is positioned radially in line with one of the lugs 37, so that the bearing plug 30$^a$ bears by its free end against the bottom of one of the grooves 35.

In both forms of structure the hold of the brace on the bolt is effected without special locking or positioning means, and I find that the operation is satisfactory without such special means.

In the arrangement shown in Fig. 9 the work 10$^b$ is higher than the work 10 shown in Fig. 1, and the bolt 14$^b$ is correspondingly longer than the bolt 14 shown in the said figure. Mounted on the upper end portion of the bolt 14$^b$ is an upper brace 24, which, as shown, is like that shown in the said figure and used in precisely the same way in coöperation with the clamp 18. Mounted on the lower end portion of the said bolt 14$^b$ is a second brace 24 and in inverted position relatively to the other brace 24, the free end 27 of the lateral arm 26 being in bearing engagement with the top face of the bed 11$^b$. Thus the lower brace 24 is operative as a side brace under the clamping strain, suitably to reinforce the bolt and prevent buckling of the same.

I claim as my invention:—

1. A work holding combination comprising a bolt, a clamp extending across the said bolt, a brace slidably engaged with the said bolt, and having a laterally extending arm for engaging with one end of the said clamp, and a nut, mounted on the said bolt, for engaging with the said clamp.

2. In a work holding combination, comprising a work engaging clamp, a bolt, and a nut, a brace for interconnecting the said bolt and clamp, the said brace comprising a sleeve portion for sliding along the said bolt and an arm, extending laterally from the said sleeve portion for engaging with the said clamp.

3. In a work holding combination, a brace for being mounted on a bolt and having a free arm for engaging with a clamp, and a friction member incorporated in the body-structure of the said brace for resiliently bearing against the said bolt.

ALBERT OLAI MATHISON.